United States Patent Office 3,567,733
Patented Mar. 2, 1971

3,567,733
PROCESS FOR THE PREPARATION OF INTERMEDIATES FOR THE SYNTHESIS OF STEROIDS
Gerard Nominé, Noisy-le-Sec, France, and Arturo Bladé, Barcelona, Spain, assignors to Roussel-UCLAF, Paris, France
No Drawing. Filed Sept. 19, 1967, Ser. No. 668,954
Claims priority, application France, Sept. 22, 1966, 77,301
Int. Cl. C07d 33/48
U.S. Cl. 260—287      14 Claims

ABSTRACT OF THE DISCLOSURE

This invention relates to a process for the preparation of 1β-hydroxy 5-oxo-4-(2'-carboxyethyl)-7aβ-R-3aα,4β,5,6,7,7a-hexahydroindanes of the formula

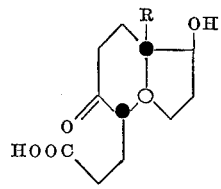

wherein R is lower alkyl, which comprises the steps of (1) subjecting a 1β - hydroxy-5-oxo-4-(2'-carboxyethyl)-7aβ-R-5,6,7,7a-tetrahydroindane of the formula

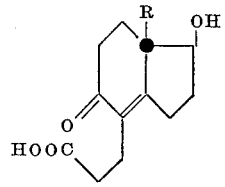

wherein R has the above-assigned value, to the action of a lactamizing agent of the formula

R''—COO⊖R'NH$_3$ wherein R' is selected from the group consisting of hydrogen, lower alkyl and aryl-lower alkyl and R'' is lower alkyl, (2) esterifying the resultant lactam by the action of a lower alkanoic acid esterifying agent, (3) selectively reducing the 14–15 double bond of the resultant 17β-OR'''-13β-R-des-A-10-aza-Δ$^{8,14}$-gonadiene - 5 - one of the formula

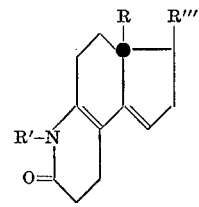

wherein R and R' have the above-assigned values and R''' is lower alkanoyl, by catalytic hydrogenation, (4) hydrolyzing the resultant 17β-OR'''-13β-R-des-A-10-aza-Δ$^8$-gonene-5-one of the formula

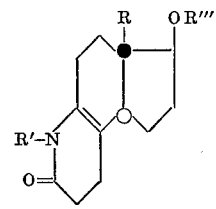

wherein R, R' and R''' have the above-assigned values, with a strong acid hydrolyzing agent, and (5) recovering said 1β - hydroxy - 5 - oxo-4(2'-carboxyethyl)-7aβ-R-3aα,4β,5,6,7,7a-hexahydroindanes. The latter is useful as an intermediate in the total synthesis of steroids.

THE PRIOR ART

The said 1β-hydroxy-5-oxo-4-(2'-carboxyethyl)-7aβ-R-3aα,4β,5,6,7,7a-hexahydroindanes of the Formula IV

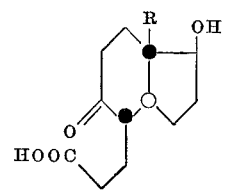

wherein R is lower alkyl, such as methyl, ethyl, n-propyl, etc., are described and disclosed as intermediates in the total synthesis of steroids in French Patents No. 1,364,556 and No. 1,476,509 as well as in the commonly assigned United States patent application Ser. No. 361,872, filed Apr. 22, 1964, now U.S. Pat. No. 3,413,314. This patent, as well as the corresponding cited French patents and Velluz et al., C. R. Acad. Sci. 257, 3086 (1963) all disclose starting materials of the present invention.

According to this synthesis, 1β-hydroxy-5-oxo-4-(2'-carboxyethyl) - 7aβ - R - 5,6,7,7a - tetrahydro-indane of Formula I

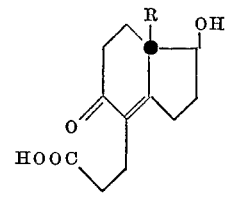

or a 1β-ester of a lower organic carboxylic acid of this compound is subjected to a catalytic hydrogenation, followed, in the case where esters are employed, by an alkaline treatment. However, this method furnishes only amorphous products which must be purified if it is desired to obtain compounds possessing precise physical characteristics.

OBJECTS OF THE INVENTION

An object of this invention is the development of an improved process for the obtention of 1β-hydroxy-5-oxo-4 - (2' - carboxyethyl)-7aβ-R-3aα,4β,5,6,7,7a-hexahydroindanes starting from 1β-hydroxy-5-oxo-4-(2'-carboxyethyl)-7aβ-R-5,6,7,7a-tetrahydroindanes.

Another object of the invention is the development of a process for the prepaartion of 1β-hydroxy-5-oxo-4-(2'-carboxyethyl)-7aβ - R - 3aα,4β,5,6,7,7a-hexahydroindanes of the formula wherein R is lower alkyl, which comprises the steps of (1) subjecting a 1β-hydroxy-5-oxo-4-(2'-carboxyethyl)-7aβ-R-5,6,7,7a-tetrahydroindane of the formula

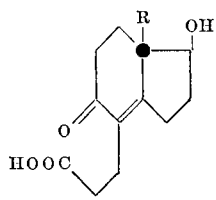

wherein R has the above-assigned value, to the action of a lactamizing agent of the formula

R''—COO⊖R'NH₃ wherein R' is selected from the group consisting of hydrogen, lower alkyl and aryl-lower alkyl and R'' is lower alkyl, (2) esterifying the resultant lactam by the action of a lower alkanoic acid esterifying agent, (3) selectively reducing the 14–15 double bond of the resultant 17β-OR'''-13β-R-des-A-10-aza-Δ⁸,¹⁴-gonadiene-5-one of the formula

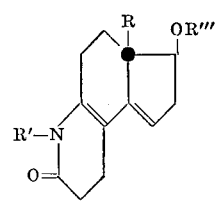

wherein R and R' have the above-assigned values and R''' is lower alkanoyl, by catalytic hydrogenation, (4) hydrolyzing the resultant 17β-OR'''-13β-R-des-A-10-aza-Δ⁸-gonene-5-one of the formula

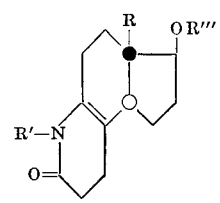

wherein R, R' and R''' have the above-assigned values, with a strong acid hydrolyzing agent, and (5) recovering said 1β-hydroxy-5-oxo-4-(2'-carboxyethyl)-7aβ-R-3aα,4β,5,6,7,7a-hexahydroindanes.

A yet further object of the invention is the obtention of the novel intermediates:

(a) A 17β-OR^iv-13β-R-des-A-10-aza-Δ⁸,¹⁴-gonadiene-5-one of the formula

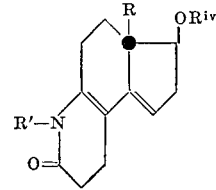

wherein R is lower alkyl, R' is selected from the group consisting of hydrogen, lower alkyl and aryl-lower alkyl, and R^iv is selected from the group consisting of hydrogen and lower alkanoyl; and (b) A 17β-OR'''-13β-R-des-A-10-aza-Δ⁸-gonene-5-one of the formula

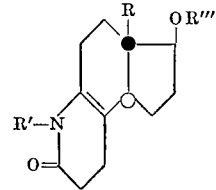

wherein R is lower alkyl, R' is selected from the group consisting of hydrogen, lower alkyl and aryl-lower alkyl and R''' is lower alkanoyl.

These and other objects of the invention will become more apparent as the description thereof proceeds.

DESCRIPTION OF THE INVENTION

As is clearly comprehensible from the following, the new process, an object of the invention, involves the synthesis by means of the des-A-10-aza steroid derivatives, which offer the advantage of being particularly easily accessible and being distinguished for a high degree of purity and by a very good stability. Another advantage of the new process resides in the fact that this process leads to crystallizable products readily furnishing the precisely characterized hexahydroindanes of Formula IV.

The process for the preparation of the hexahydroindanes of Formula IV, object of the invention, is characterized in that a 1β-hydroxy-5-oxo-4-(2'-carboxyethyl)-7aβ-R-5,6,7,7a-tetrahydroindane of Formula I

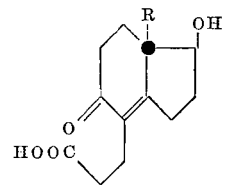
I wherein R is a lower alkyl, such as methyl, ethyl, n-propyl, etc., is subjected to the action of a lactamizing agent of the formula

R''COO⊖R'NH₃ wherein R' represents hydrogen, a lower alkyl or a lower aralkyl, such as a phenyl-lower alkyl, and R'' represents a lower alkyl radical, the resultant lactamized product is treated with a lower alkanoic acid esterifying agent, thus obtaining 17β-OR'''-13β-R-des-A-10-aza-Δ⁸,¹⁴-gonadiene-5-ones of Formula II

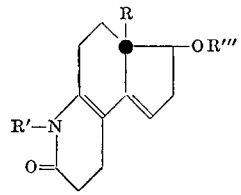
II wherein R and R' have the previous meaning, and R''' represents lower alkanoyl.

The 14–15 double bond of the said gonadiene is selectively reduced by catalytic hydrogenation, thus obtaining the 17β-OR'''-13β-R-des-A-10-aza-Δ⁸-gonene-5-ones of Formula III

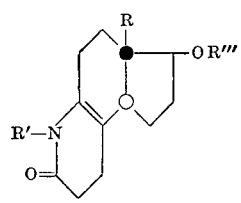
III wherein R, R' and R''' have the previous significance, and, finally, this compound is subjected to an acid hydrolysis and the desired hexahydroindane is isolated.

To execute the first step of the process of the invention, that is to say, the lactamization of the tetrahydroindane of Formula I, it is advantageous to carry out the work in the presence of an agent, which reduces the melting point of the reaction mixture. This agent, which can be solid or liquid, can be advantageously, but not compulsorily, an amide, for example, lower alkanoic acid amides and N,N-di-lower alkylamides of lower alkanoic acids, such as acetamide or dimethylformamide. This agent must be such as to realize this conversion at temperatures in the range of 85° C. and by working under atmospheric pressure. This is obviously an advantage of the present invention. It is known that the conversion of 5-oxo acids into lactams by ammonia or amines frequently requires the employment of more elevated temperatures as well as the requirement of operating under pressure.

Of course, this first step of the process can just as well be executed in the absence of such an agent by elevating the temperature close to the melting point of the lactamizing agent. Even in this case, the work is carried out under atmospheric pressure.

As lactamizing agent, ammonium acetate or the N-lower alkyl ammonium acetates or the N-lower aralkyl ammonium acetates, such as benzylammonium acetate, can be conveniently employed.

At the time of this conversion, as a rule, a mixture of 17β-hydroxy-13β-R-des-A-10-aza-$\Delta^{8,14}$-gonadiene-5-one and of the corresponding derivative esterified in the 17-position by the acyl of the quaternary ammonium compound utilized is formed. For the process of the synthesis, it is advantageous to convert this mixture into a homogenous product by esterification. This esterification can be conducted under the usual esterification conditions utilizing a lower alkanoic acid esterifying agent such as the acid anhydride corresponding to the acid of the quaternary ammonium lactamizing agent. It is preferable to use a quaternary ammonium acetate lactamizing agent and acetic acid anhydride as the esterifying agent, for convenience and availability. The esterification can be conducted under the usual conditions such as in solution in pyridine.

The selective hydrogenation of the $\Delta^{8,14}$-gonadiene of Formula II is advantageously effected by employing a catalyst with a palladium base, such as elemental palladium on a carrier. Catalysts with a platinum base are also suitable. However, the result is less favorable. This reduction is advantageously carried out in the presence of an organic base, such as triethylamine, and in the presence of an inert solvent. For example, tetrahydrofuran, a tetrahydrofuran-ethanol mixture, etc., can be utilized.

The acid hydrolysis of the $\Delta^8$-gonene of Formula III is advantageously effected by means of a strong mineral acid, such as hydrochloric acid or sulfuric acid, in the presence of small amounts of water.

The following example will serve for better comprehension of the invention. However, it is to be understood that it does not limit the scope of the invention in any manner.

EXAMPLE

Preparation of 1β-hydroxy-5-oxo-4-(2'-carboxyethyl)-7aβ-methyl-3aα,4β,5,6,7,7a-hexahydroindane (IV, R=CH₃)

Step A: Preparation of 17β-acetoxy-des-A-10-aza-$\Delta^{8,14}$-estradiene-5-one (II, R=CH₃, R'=H, R'''=COCH₃).—Under an atmosphere of nitrogen, 10 gm. of 1β-hydroxy-5-oxo-4-(2'-carboxyethyl)-7aβ-methyl-5,6,7,7a - tetrahydroindane (I, R=CH₃) were introduced into 50 cc. of dimethylformamide, 50 gm. of ammonium acetate were added thereto, and the mixture was heated under agitation on a steam bath for five and a half hours without exceeding the (internal) temperature of 85° C. Thereafter, the reaction mixture was cooled, poured into water and extracted with methylene chloride containing 10% of ethanol. The extracts were washed first with a sodium bicarbonate solution, then with water, filtered, dried and distilled to dryness. Des-A-10-aza-$\Delta^{8,14}$-estradiene-17β-ol-5-one was recovered, partly acetylated in the 17-position.

The product thus obtained was introduced into 50 cc. of pyridine containing 30 cc. of acetic acid anhydride. Next, the reaction mixture was heated at 50° C. for several minutes, then it was allowed to stand for 2 hours at room temperature. Thereafter, ice was added to the reaction mixture which was then cooled externally. After 15 minutes, water was added. The reaction mixture was iced and the formed product was vacuum filtered. This product was then washed with water, dried and recrystallized from a methylene chloride-ethanol mixture. 8 gm. of 17β - acetoxy - des-A-10-aza-$\Delta^{8,14}$-estradiene - 5 - one (II, R=CH₃, R'=H, and R'''=COCH₃) was obtained. The product had a melting point of 215° C. with sublimation and a specific rotation $[\alpha]_D^{20} = -162° \pm 3°$ (c.=0.64% in chloroform).

The product occurred in the form of colorless prisms, very soluble in chloroform and tetrahydrofuran, soluble in alcohols, slightly soluble in acetone, even less soluble in ether, and insoluble in water.

Analysis.—C₁₅H₁₉O₃N; molecular weight=261.31. Calculated (percent): C, 68.94; H, 7.33; N, 5.36. Found (percent): C, 68.7; H, 7.3; N, 5.5.

Ultraviolet spectra (in ethanol):

$\lambda$ max. at 222 m$\mu$ $E_{1cm.}^{1\%} = 259$ infl. toward 238 m$\mu$ $E_{1cm.}^{1\%} = 218$ $\lambda$ max. at 287 m$\mu$ $E_{1cm.}^{1\%} = 571$ Circular dichroism:

$\Delta\epsilon$ at 290 m$\mu$ = —6.45
$\Delta\epsilon$ at 212 m$\mu$ = —8.30

The curve of the circular dichroism confirms the absence of the starting product.

This compound is not described in the literature.

The des-A-10-aza-$\Delta^{8,14}$-estradiene-17β-ol-5-one, partly acetylated in the 17-position, obtained intermediarily as previously described, can be converted into the pure alcohol by the following method.

The said product was dissolved in a mixture consisting of 40 cc. of methanol and 10 cc. of water, then 5 cc. of 2 N sodium hydroxide solution were added, then the solution was allowed to stand at room temperature for 45 minutes. The reaction mixture was neutralized by the addition of concentrated acetic acid. The methanol was removed by distillation under vacuum and the reaction mixture was iced. The product formed was vacuum filtered, dried and recrystallized from methanol. In this manner, 6.8 gm. of des-A-10-aza-$\Delta^{8,14}$-estradiene-17β-ol-5-one, solvated with methanol, were obtained, having a melting point of 200° C. with sublimation and a specific rotation $[\alpha]_D^{20} = -116° \pm 2.5°$ (c.=0.6% in chloroform).

The product occurred in the form of slightly yellow prisms, soluble in alcohols and chloroform, very slightly soluble in ether, and insoluble in water.

Analysis.—C₁₃H₁₇O₂N; molecular weight=219.27. Calculated (percent): C, 71.20; H, 7.82; N, 6.39. Found (percent): C, 71.0; H, 7.9; N, 6.6.

Ultraviolet spectra:

$\lambda_{max.}$ at 224 m$\mu$ $E_{1cm.}^{1\%} = 301$ $\lambda_{max.}$ at 286 m$\mu$ $E_{1cm.}^{1\%} = 595$ Circular dichroism:

$\Delta\epsilon$ at 290 m$\mu$ = —3.18 max.

$\Delta\epsilon$ at 250 m$\mu$ = 0

$\Delta\epsilon$ at 215 m$\mu$ = —4.10 max.

The circular dichroism curve showed the same characteristics as that of the 17β-acetoxylated product, but the values were weaker. The absence of the starting product was noted.

This product is not described in the literature.

Step B: Preparation of 17β-acetoxy-des-A-10-aza-$\Delta^8$-estrene-5-one (III, R=CH₃, R'=H, R'''=COCH₃).—Under an atmosphere of nitrogen, 5.225 gm. of 17β-acetoxy-des-A-10-aza-$\Delta^{8,14}$-estradiene - 5 - one (II, R=CH₃, R'=H, R'''=COCH₃) were introduced into 52 cc. of tetrahydrofuran. Next, 52 cc. of ethanol, 1.05 cc. of triethylamine and 131 mg. of 10% palladium on alumina were added. The solution obtained was hydrogenated until 472 cc. of gas had been absorbed (at the end of about two hours). Thereafter, the solution was filtered. The filtrate was evaporated to dryness under vacuum. Thus, the 17β-acetoxy-des-A-10-aza-Δ⁸-estrene-5-one (III, R=CH₃, R'=H, and R'''=COCH₃) was recovered in the crude state. For analysis, this product was recrystallized from ethanol, obtaining, with a yield of 70%, a compound with a melting point of 224.5° C. and a specific rotation $[\alpha]_D^{20} = -37° \pm 1.50°$ (c.=0.9% in chloroform).

This product occurred in the form of colorless prisms, very soluble in chloroform and slightly soluble in alcohol and ether.

*Analysis.*—$C_{15}H_{21}O_3N$; molecular weight=263.33. Calculated (percent): C, 68.41; H, 8.04; N, 5.32. Found (percent): C, 68.4; H, 7.9; N, 5.1.

Ultraviolet spectra (in ethanol):

$$\lambda_{max}. \text{ at } 258 \text{ m}\mu \text{ } E_{1\text{ cm.}}^{1\%} = 220$$

This product is not described in the literature.

Step C: Preparation of 1β-hydroxy-5-oxo-4-(2'-carboxyethyl) - 7Aβ - methyl - 3Aα,4β,5,6,7,7a - hexahydroindane (IV, R=CH₃).—The raw 17β-acetoxy-des-A-10 - aza - Δ⁸ - estrene - 5 - one (III, R=CH₃, R'=H and R'''=COCH₃), obtained in Step B, was suspended in 52 cc. of a 2 N hydrochloric acid solution. The suspension was heated at 85° C. for 45 minutes. Then it was cooled, poured into 52 cc. of water and extracted with ethyl acetate. The extracts were dried over sodium sulfate, filtered and evaporated to dryness under vacuum. The resultant residue was taken up in boiling ether, then allowed to stand for several hours at room temperature. 3.51 gm. of 1β-hydroxy-5-oxo-4-(2'-carboxyethyl)-7aβ methyl - 3aα,4β,5,6,7,7a - hexahydroindane (IV, R=CH₃) were obtained. The product had a melting point of 155° C. and a specific rotation $[\alpha]_D^{20} = +11.5° \pm 1°$ (c.=1.25% in ethanol).

*Analysis.*—$C_{13}H_{20}O_4$; molecular weight=240.29. Calculated (percent): C, 64.98; H, 8.39; Found (percent): C, 64.7; H, 8.4.

The preceding specific embodiments are illustrative of the practice of the invention. It is to be understood, however, that other expedients known to those skilled in the art can be employed without departing from the spirit of the invention or the scope of the appended claims.

We claim:

1. A process for the preparation of 1β-hydroxy-5-oxo-4-(2'-carboxyethyl)-7aβ-R-3aα,4β,5,6,7,7a - hexahydroindanes of the formula

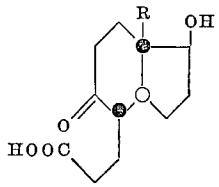

wherein R is lower alkyl, which consists essentially of the steps of (1) subjecting a 1β-hydroxy-5-oxo-4-(2'-carboxyethyl) - 7aβ-R-5,6,7,7a-tetrahydroindane of the formula

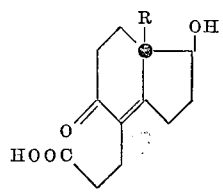

wherein R has the above-assigned value, to the action of an agent of the formula

R''—COO-R'NH₃ wherein R' is selected from the group consisting of hydrogen, lower alkyl and phenyl-lower alkyl and R'' is lower alkyl, (2) esterifying the resulting lactam by the action of a lower alkanoic acid esterifying agent having an acyl of the formula

R''CO wherein R'' has the above-assigned value, (3) selectively reducing the 14–15 double bond of the resultant 17β-OR'''-13β-R-des-A-10-aza-Δ⁸,¹⁴-gonadiene-5-one of the formula

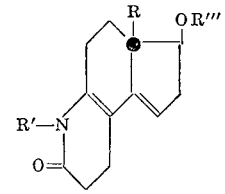

wherein R and R' have the above-assigned values and R''' is lower alkanoyl, by catalytic hydrogenation employing a catalyst selected from the group consisting of palladium and platinum catalysts, (4) hydrolyzing the resultant 17β-OR'''-13β-R-des-A-10-aza-Δ⁸-gonene-5-one of the formula

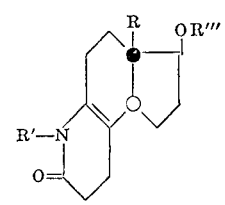

wherein R, R' and R''' have the above-assigned values, with a strong acid hydrolyzing agent in the presence of water, and (5) recovering said 1β-hydroxy-5-oxo-4-(2'-carboxyethyl)-7aβ-R-3aα,4β,5,6,7,7a-hexahydroindane.

2. The process of claim 1, step (1), wherein the lactamizing step is conducted in the presence of an agent which lowers the melting point of the reaction mixture to a temperature of about 85° C. under atmospheric pressure selected from the group consisting of lower alkanoic acid amides and N,N-di-lower alkyl amides of lower alkanoic acids.

3. The process of claim 2 wherein said agent which lowers the melting point of the reaction mixture is selected from the group consisting of acetamide and dimethylformamide.

4. The process of claim 1, step (1), wherein said lactamizing agent is selected from the group consisting of ammonium acetate, N-lower alkyl ammonium acetate and N-benzyl ammonium acetate.

5. The process of claim 4, wherein said lactamizing agent is amonium acetate.

6. The process of claim 1, step (3), wherein said catalytic hydrogenation is conducted in the presence of a palladium base catalyst and in the presence of an organic base and an inert organic solvent.

7. The process of claim 6 wherein said organic base is triethylamine and said inert organic solvent is selected from the group consisting of tetrahydrofuran and mixtures of tetrahydofuran and ethanol.

8. The process of claim 1, step (4), wherein said strong acid hydrolyzing agent is an aqueous strong mineral acid.

9. The process of claim 8, wherein said strong mineral acid is selected from the group consisting of hydrochloric acid and sulfuric acid.

10. A 17β-OR^iv-13β-R-des-A-10-aza-Δ⁸,¹⁴-gonadiene-5-one of the formula

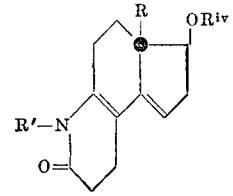

wherein R is lower alkyl, R' is selected from the group consisting of hydrogen, lower alkyl and phenyl-lower alkyl, and $R^{iv}$ is selected from the group consisting of hydrogen and lower alkanoyl.

11. The compound of claim 10 wherein R is methyl, and $R^{iv}$ and R' are hydrogen.

12. The compound of claim 10, wherein R is methyl, R' is hydrogen and $R^{iv}$ is acetyl.

13. A 17β-OR'''-13β-R-des-A-10-aza-Δ⁸-gonene-5-one of the formula

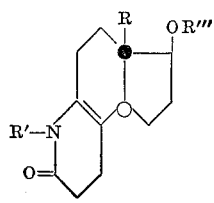

wherein R is lower alkyl, R' is selected from the group consisting of hydrogen, lower alkyl and phenyl-lower alkyl and R''' is lower alkanoyl.

14. The compound of claim 13, wherein R is methyl, R' is hydrogen and R''' is acetyl.

References Cited

UNITED STATES PATENTS

| | | | |
|---|---|---|---|
| 2,227,876 | 1/1941 | Bolt | 260—269 |
| 2,839,537 | 6/1958 | Miescher | 260—514X |
| 3,022,312 | 2/1962 | Wildi | 260—289 |
| 3,413,314 | 12/1968 | Amiaro et al. | 260—343.2 |
| 3,478,062 | 11/1969 | Amiaro et al. | 260—514X |

DONALD G. DAUS, Primary Examiner

U.S. Cl. X.R.

260—289, 514, 561, 690